US008859724B2

(12) United States Patent
Meier et al.

(10) Patent No.: US 8,859,724 B2
(45) Date of Patent: Oct. 14, 2014

(54) MANUFACTURE AND USE OF MODIFIED POLYSACCHARIDE CHITOSAN BONDS AND A PROCESS TO IMPROVE THE PREPARATION OF HES-MEDICINAL SUBSTANCE COMPOUNDS (75) Inventors: Bernd H. Meier, Darmstadt (DE); Nele Meier, Darmstadt (DE)

(73) Assignee: B. Braun Melsungen AG, Melsungen (DE)

( * ) Notice: Subject to any disclaimer, the term of this patent is extended or adjusted under 35 U.S.C. 154(b) by 1588 days.

(21) Appl. No.: 12/293,784

(22) PCT Filed: Apr. 26, 2007

(86) PCT No.: PCT/EP2007/054124
§ 371 (c)(1),
(2), (4) Date: Aug. 10, 2010

(87) PCT Pub. No.: WO2007/122269
PCT Pub. Date: Nov. 1, 2007

(65) Prior Publication Data
US 2010/0298529 A1    Nov. 25, 2010

(30) Foreign Application Priority Data

Apr. 26, 2006 (DE) .......................... 10 2006 020 035

(51) Int. Cl.
| C07K 2/00 | (2006.01) |
| C08B 37/08 | (2006.01) |
| C07K 14/00 | (2006.01) |
| C07K 14/575 | (2006.01) |
| C07K 14/52 | (2006.01) |
| C07K 14/765 | (2006.01) |
| C07F 19/00 | (2006.01) |
| B05D 1/04 | (2006.01) |
| C08B 35/00 | (2006.01) |
| C08B 33/00 | (2006.01) |

(52) U.S. Cl.
CPC ............... *C08B 37/003* (2013.01); *C08B 35/00* (2013.01); *C08B 33/00* (2013.01)
USPC ........... 530/322; 530/351; 530/363; 530/395; 530/399; 427/458; 534/15; 536/20

(58) Field of Classification Search
None
See application file for complete search history.

(56) References Cited

U.S. PATENT DOCUMENTS

| 4,632,762 A | 12/1986 | Ramsland |
| 5,015,293 A * | 5/1991 | Mayer et al. ................ 106/162.2 |
| 2003/0104020 A1 * | 6/2003 | Davison et al. ............... 424/401 |
| 2005/0063943 A1 * | 3/2005 | Sommermeyer et al. .... 424/85.1 |

FOREIGN PATENT DOCUMENTS

| DE | 3102574 A1 | 8/1982 |
| EP | 0 051 354 A2 | 5/1982 |
| EP | 0 934 771 A1 | 8/1999 |
| EP | 1 152 013 A1 | 11/2001 |
| JP | 02 145602 | 6/1990 |
| WO | WO 79/00603 | 8/1979 |
| WO | WO 94/16750 | 8/1994 |
| WO | WO 96/02259 | 2/1996 |
| WO | WO 96/02260 | 2/1996 |
| WO | WO2004/073034 A2 * | 8/2004 |
| WO | WO 2005/075501 A1 | 8/2005 |

OTHER PUBLICATIONS

Xu et al., "Chitosan-starch composite film: preparation and characterization", 2004, Industrial Crops and Products, vol. 21, pp. 185-192.*
International Search Report completed Jul. 12, 2007 and mailed Aug. 2, 2007 from corresponding PCT Application No. PCT/EP2007/054124, Filed Apr. 26, 2007 (6 pages).
Park et al., "Galactosylated Chitosan-Graft-Dextran as Hepatocyte-Targeting DNA Carrier," Journal of Controlled Release, vol. 69, accepted Jun. 12, 2000 (12 pages).
Roberts et al., "The Coupling of Chitosan to Preformed Polymer Beads," 1297a Die Makromolekulare Chemie, Rapid Communications, No. 7, Jul. 10, 1989, Basel, China, XP000074704 (5 pages).
Paradossi et al., "H NMR Relaxation Study of a Chitosan-Cyclodextrin Network," Carbohydrate Research, vol. 300, accepted Dec. 17, 1997, XP000687262 (8 pages).
Yalpani et al., "Some Chemicals and Analytical Aspects of Polysaccharide Modifications. 3. Formation of Branched-Chain, Soluble Chitosan Derivatives," Macromolecultes, vol. 17, 1984, XP002206891 (10 pages).
International Preliminary Report on Patentability from corresponding PCT Application No. PCT/EP2007/054124, filed Apr. 26, 2007 (13 pages).

* cited by examiner

*Primary Examiner* — Bethany Barham
*Assistant Examiner* — Randeep Singh
(74) *Attorney, Agent, or Firm* — RatnerPrestia (57) ABSTRACT The invention relates to a bonding product suitable as a carrier for medicinal substances and to the compound derived therefrom that carries medicinal substances. The invention further relates to a process and device for preparing such bonding products and compounds. Further, the invention relates to a pharmaceutical composition containing such bonding products and compounds, and to the use thereof for preparing an infusible medicament for treating a disease.

39 Claims, 2 Drawing Sheets

MANUFACTURE AND USE OF MODIFIED POLYSACCHARIDE CHITOSAN BONDS AND A PROCESS TO IMPROVE THE PREPARATION OF HES-MEDICINAL SUBSTANCE COMPOUNDS

CROSS-REFERENCE TO RELATED APPLICATIONS

This application claims priority of International Application No. PCT/EP2007/054124, filed Apr. 26, 2007, entitled MANUFACTURE AND USE OF MODIFIED POLYSACCHARIDE-CHITOSAN BONDS AND A PROCESS TO IMPROVE THE PREPARATION OF HES-MEDICINAL SUBSTANCE COMPOUNDS, which claims the benefit of German application 10 2006 020 035.7, filed Apr. 26, 2006, the contents of which are expressly incorporated herein by reference.

DESCRIPTION

The invention relates to a bonding product suitable as a carrier for medicinal substances, and to the compound derived therefrom that carries medicinal substances. The invention further relates to a process and device for preparing such bonding products and compounds. Further, the invention relates to a pharmaceutical composition containing such bonding products and compounds, and to the use thereof for preparing an infusible medicament for treating a disease.

BACKGROUND

EP-A-1 230 935 describes the introduction of drug molecules into polysaccharides, which is non-uniform, however, with respect to the frequency of drug molecules bound per polysaccharide molecule and the binding sites of such molecules. Thus, it can be observed that a large number of smaller drug molecules are bound to single polysaccharide molecules while others remain substantially unoccupied. On the one hand, this substantially reduces the yield of desired coupling products, and on the other hand, it is very tedious to separate the desired coupling products, i.e. the polysaccharide compounds with the desired number of introduced molecules, from undesired coupling products. If coupling reactions are performed in which the drugs are to be bound into the starch molecule by linker molecules, undesirable cross-linking of the polysaccharides themselves may occur.

It is possible to avoid such cross-linking in the special case where exactly one molecule of the medicinally active substance is to be bound to one polysaccharide molecule each. Here, it is possible to bind this medicinal substance to the terminal aldehyde group of the terminal glucose monomer of starch as described in DE 102 09 822 A1.

However, when several drug molecules are bound via polyvalent linker molecules, the regioselective controllability of the binding or substitution is lost. A corresponding bonding of medicinal substances with hydroxyethyl starch (HES) in terms of a HESylation of active substances, i.e., the chemical coupling of different HES variants to medicinal substances, is disclosed in DE 101 12 825 A1, the course of the reaction in an aqueous solution being described.

In the mentioned process, either one medicinally active molecule is bound to exactly one terminal aldehyde group, or an unknown number of medicinally active molecules is non-specifically bound to the hydroxyethyl starch covalently via linkers.

In hydroxyethyl starch as in the majority of drags, hydroxy groups are primarily available for bonding. Bifunctional carboxylic acids may be used as linkers. It is known that dicarboxylic acid chlorides act as cross-linking agents for polysaccharides. When esterified with dicarboxylic acid chlorides, for example, malonic acid dichloride, a pronounced mutual cross-linking of the polysaccharides occurs in addition to the desired bonding of the medicinally active substance into the polysaccharide through an ester linkage.

By bonding medicinal substances to hydroxyethyl starch, such medicinal substances can be hydrophilized. In addition, the drug-HES compound obtained is colloid-osmotically active, like hydroxyethyl starch itself.

However, further utilizable physico-chemical principles of action are desirable for the control of and specific influence on the activity of bound medicinal substances.

Accordingly, it is the object of the invention to provide a compound suitable as a carrier for medicinal substances and a compound derived therefrom that carries medicinal substances, wherein said compounds additionally have good water solubility, a specific charge pattern with both positive and negative charges (dipole), a low allergenic activity and complete degradability.

SUMMARY

The object of the invention was achieved by a bonding product (I) consisting of m molecules of a polysaccharide X with a polysaccharide A, wherein said polysaccharide A is selected from the group of chitins or chitosans, m is an integer of from 1 to 10,000, and the linkage between X and A is an amine and/or amide linkage.

Further subject matters of the invention relate to a process and a device for preparing the bonding product (I) and derivatives, a pharmaceutical composition comprising the bonding product (I) and derivatives, and uses of the bonding product (I) and derivatives.

DETAILED DESCRIPTION

The invention relates to a bonding product (I) consisting of m molecules of a polysaccharide X with a polysaccharide A, wherein said polysaccharide A is selected from the group of chitins or chitosans, m is an integer of from 1 to 10,000, and the linkage between X and A is an amine and/or amide linkage. According to the invention, medicinal substances, i.e., pharmaceutically active compounds, may be bound covalently to the bonding product (I). Alternatively, medicinal substances may be aggregated to said bonding product (I) by complex formation.

Thus, the bonding product (I) describes polysaccharide compounds bound to chitosan or chitin that may be used as carriers for the regioselective substitution of the colloid bound to chitosan or chitin, respectively.

According to the invention, "chitin" means a linear polysaccharide built of (1→4)-linked 2-acetamido-2-deoxy-β-D-glucopyranose residues in which less than 40% of the acetamide groups is deacetylated to amine groups. Chitosan is the water-soluble, completely or partially deacetylated derivative of chitin, i.e., it consists of (1→4)-linked 2-acetamido-2-deoxy-β-D-glucopyranose and 2-amino-2-deoxy-β-D-glucopyranose residues. Preferred is a degree of deacetylation in chitosan of from 90% to 40%, more preferably from 75% to 60%.

Chitosan with a low degree of deacetylation, i.e., that has a low proportion of free amino groups, is particularly suitable for the isolation of the molecules of polysaccharide X on one chitosan molecule, because the distances between the individual molecules of polysaccharide X bound to chitosan A are thus advantageously enlarged.

According to the invention, the polysaccharide A comprises at least 10 monomer units, preferably at least 35, most preferably at least 50 monomer units, i.e., at least 50 N-acetylglucosamine and/or glucosamine moieties.

The N-acetylglucosamine and/or glucosamine moieties of polysaccharide A may optionally be chemically modified. An advantageous modification includes the methylcarboxylation to N,O-carboxymethylchitosan. A modification which is also advantageous is chitosan hydrochloride.

The bound polysaccharide X is preferably partially or completely substituted.

In a preferred embodiment, the polysaccharide X is not chitin and/or chitosan (X≠A). More preferably, the polysaccharide X is selected from the group consisting of starches, amyloses, amylopectins, acemannans, dextrans, arabinogalactans, galactomannans, galactoglucomannans, xanthans, carrageenans, alginates, guar gum, gum acacia, agarose, heparins, heparan sulfates, chondroitin sulfate, hyaluronic acid, gum arabic and mixtures thereof. More preferably, the polysaccharide X is selected from the group of polysaccharides containing galactose, mannose and guluronic acid, arabinogalactans, galactomannans, galactoglucomannans, acemannans and xanthans.

The polysaccharide X is preferably selected from naturally occurring complex polysaccharides, such as carrageenans, alginates, guar gum, gum acacia, agarose and gum arabic.

A particular embodiment of the invention is the reaction of endogenous physiologically active polysaccharides, such as heparin or chondroitin sulfate, as polysaccharide X to form the bonding product (I) according to the invention.

When heparin is used as polysaccharide X, the anticoagulant activity and topically inhibiting effects of heparin on macrophages and granulocytes is associated with the adhesive, surface-active and film-forming properties of chitosan. The introduction of chondroitin sulfate compounds as polysaccharide enables the preparation of an artificial film-forming and cartilaginoid cover layer consisting of biodegradable low-allergic tissue. Another modification is the introduction of hyaluronic acid as polysaccharide X into the bonding product according to the invention.

According to the invention, the polysaccharide X comprises at least 10, preferably at least 20, more preferably at least 325, monomer units. Preferred are glucose units, which more preferably may be chemically modified. The polysaccharide X also preferably comprises galactose and/or mannose units.

The water solubility of polysaccharide X and the affinity between polysaccharide X and other colloid-forming materials can be influenced by the proportion of galactose units. It is known that the intermolecular interactions between polysaccharides and galactomannans (also galactoglucomannans) and between proteins and galactomannans (also galactoglucomannans) and the water solubility of the galactomannans can be influences essentially by the ratio of galactose units to mannose units. Therefore, a particularly advantageous polysaccharide X from the group of galactomannans or galactoglucomannans has a galactose to mannose ratio of from 1:3 to 1:5.

The glycosidically linked glucose molecules may be substituted at positions 2, 3 and 6, a substitution at atoms C-2 and C-6 being preferred. Preferably, the molar ratio of the substituents at X to X is at most 10,000.

The molar substitution MS is defined as the ratio of the total number of substituents to the total number of monomer units. A molar substitution within a range of from 0.3 to 0.85 or less than 0.3 is preferred. Further preferred is a molar substitution within a range of from 0.4 to 0.7, more preferably within a range of from 0.5 to 0.6.

The degree of substitution DS is defined as the ratio of the total number of substituted monomer units to the total number of monomer units. A degree of substitution within a range of from 0.3 to 0.75 or less than 0.3 is preferred. Further preferred is a molar substitution within a range of from 0.4 to 0.65, more preferably within a range of from 0.5 to 0.55, wherein the degree of substitution is not greater than the value of molar substitution.

"Partially substituted" means that the polysaccharide has a degree of substitution DS of at least 0.02. The polysaccharide is considered completely substituted if the molar substitution MS is larger than 0.97.

The C2/C6 substitution ratio is defined as the ratio of the total number of substituents coupled to the C2 position of the glucose unit to the total number of substituents coupled to the C6 position of the glucose unit. Preferably, the C2/C6 substitution ratio is within a range of from 3 to 12, more preferably within a range of from 4 to 6.

Like other synthetic colloids, the polysaccharide X is not a unitary substance with a consistent molecular weight. Instead, it is always a polydisperse mixture of molecules of different sizes, which can be defined, for example, by its molecular weight distribution. The width and position of the maximum of the molecular weight distribution can be influenced by the preparation and purification methods as usual in the prior art.

The average molecular weight Mw is defined as the ratio of the total molecular weight to the total number of particles. The number average or median of the molecular weight distribution Mn can be determined directly by osmometry. Mn is the value at which 50% of the particles have a higher molecular weight, and 50% of the particles have a lower one.

The Mw of the bottom fraction, i.e., the Mw for the 10% of the smallest molecules of polysaccharide X, is preferably more than 20,000, more preferably more than 15,000 and also preferably between 9,000, even more preferably more than 6,500.

The Mw of the top fraction, i.e., the Mw for the 10% of the largest molecules of polysaccharide X, is preferably less than 2,160,000, more preferably less than 1,000,000, also preferably less than 550,000, and even more preferably less than 150,000.

Preferably, the polysaccharide X has an average molecular weight Mw of from 10 kDa to 500 kDa. In one embodiment of the invention, the Mw of polysaccharide X is from 150 kDa to 350 kDa. In another embodiment, the polysaccharide X has an Mw of 200 kDa.

More preferred is a hydroxyethyl starch as the polysaccharide X having a molecular weight of below 30,000 and a degree of substitution DS of smaller than or equal to 0.3, in which m is preferably from 15 to 50. Further preferred is a hydroxyethyl starch as the polysaccharide X having a molecular weight of below 4000, in which m is preferably from 100 to 200. Further preferred is a hydroxyethyl starch as the polysaccharide X having a molecular weight of below 1500, in which m is preferably from 300 to 750.

In one embodiment, the polydispersity quotient Mw/Mn of the polysaccharide X is lower than 9.5, preferably lower than 5.3, more preferably lower than 2.4.

The substituents of polysaccharide X are preferably selected from the group consisting of hydroxyethyl groups and carboxymethyl groups. In one embodiment, the hydroxy groups of the hydroxyethyl-substituted polysaccharides may be cross-linked through linker groups, for example, through Z1 and Z2, as described below, whose starting compounds preferably carry carboxy, isocyanate, carboxylic acid halide, carboxyalkylene and/or ester groups as functional groups.

In another embodiment, a starch (formally) esterified with mono- or dicarboxylic acids, for example, acetyl starch or propionyl starch, is employed as polysaccharide X. According to another embodiment, carboxylic acids may be bound into the polysaccharide X through ether linkages. Preferred are carboxy starches of the group consisting of carboxymethyl starch, carboxyethyl starch, carboxypropyl starch. Suitable monocarboxylic acids include, for example, acetic acid, propionic acid, benzoic acid, butyric acid, acrylic acid, salicylic acid, valeric acid, isovaleric acid, arginine, lysine and histidine as well as their C1-C10 alkyl esters, halides and anhydrides. Suitable dicarboxylic acids include, for example, adipic acid, pimelic acid, azelaic acid, sebacic acid, sorbic acid, phthalic acid, terephthalic acid, isophthalic acid, agaric acid, citric acid, oxalic acid, succinic acid, fumaric acid, maleic acid, glutaric acid, malonic acid, tartaric acid, malic acid, glutamic acid, aspartic acid, asparagine and glutamine as well as their C1-C10 alkyl esters, halides and anhydrides. Malonic acid dichloride is preferred.

The polysaccharide X is preferably starch, amylose and/or amylopectin, more preferably hydroxyethyl starch (HES).

In one embodiment of the invention, the polysaccharide X is HES 200/0.5. HES x/y is a hydroxyethyl starch having an average molecular weight Mw of x kDa that has a molar substitution MS of y, i.e., HES 200/0.5 has an average molecular weight Mw of 200 kDa and a molar substitution MS of 0.5.

Since chitin and chitosan itself is water-insoluble, the bonding of hydrophilic polysaccharides X to the as such hydrophobic polymeric chitin or chitosan A to form the bonding product (I) according to the invention serves for hydrophilization. The polarity of the molecule is significantly increased thereby. In addition to hydrophilization by incorporating hydroxyethyl starches, the water solubility of chitin may also be significantly improved by deacetylation, i.e., by converting chitin to chitosan. Alkaline deacetylation of chitin yields chitosan, which dissolves in organic solvents at a pH of below 6.5.

It is known that chitosan can be prepared from chitin by saponification of the acetamide groups bound to the amino groups. The reaction is performed, for example, with cautiously heating suspended chitin in 0.5 N NaOH. The degree of this saponification can be readily controlled by the temperature control of the reaction. For example, chitin suspended in 2 N acetic acid is admixed with 0.5 N NaOH under an inert gas atmosphere, and heated. The proportion of free amino groups of chitosan can be confirmed by means of the Van Slyke reaction.

Chitin and chitosan compounds have the advantage of being completely biodegradable. The compounds are degraded by chitinase, lysozyme and other lysozymal enzymes. The biocompatible and enzymatically degradable chitin and chitosan compounds are advantageously improved by the modification with optionally substituted polysaccharides according to the invention for use as an infusion substance for a number of indications. In this connection, m, i.e., the molar ratio of X to A, plays a critical role.

Chitosan is known to have complexing properties and to form complexes selectively with, for example, transition metals, such as copper, zinc and cadmium. In addition, chitosan has the property to adsorb endotoxins, nucleic acids and nanoparticles. The ability of chitosan to adsorb particles and dyes is already being widely used in the cosmetics industry and waste water technology. Use of these properties in the human body conflicts with the solubility properties of chitosan. Chitosan is advantageously dissolved at a low pH of less than 6.5 in the presence of organic acids, since the polymer compound is present as a soluble polycation under such conditions. The bonding product (I) according to the invention is a possibility for adhesion to particles, toxins, microorganisms and viruses. After the adhesion, the bonding product (I) is phagocytosed by the cells of the reticulohistiocyte system whereby the adsorbed substances can be eliminated from the body.

In one embodiment of the invention, a medicinal substance R3 is coordinatively bound (complexed) to the bonding product (I). R3 is preferably a metal ion. More preferably, R3 is iron, preferably FeII, potassium, magnesium, zinc, calcium, gadolinium and/or copper.

According to the invention, the complexing bonding product (I) can be selected in such a way that the complex can release R3 in the body and supply R3 as a trace element and/or important mineral. In another embodiment, complexing bonding product (I) is selected in such a way that the complex cannot release R3 in the body, for example, in order to enable the application of the complex as a contrast agent, preferably with R3=gadolinium.

Not only the bonding products (I) according to the invention that contain polysaccharides X on the basis of glucose units and their modifications, such as hydroxyethyl starch, carboxyethyl starch and dextrans, but mainly also the bonding products (I) that contain polysaccharides X on the basis of galactose and mannose and their modifications are well suited for introduction into the human body and parenteral administration.

A hydroxyethyl starch to be employed advantageously as polysaccharide X has an Mw of <130,000 and a DS of from 0.3 to 0.7. The C2/C6 ratio of the hydroxyethyl starch to be employed as polysaccharide X is advantageously from 4 to 6. If the bonding product (I) is employed for adsorption to antigens or the opsonization thereof, hydroxyethyl starches having a molecular weight of <60,000 Dalton, more advantageously from 1500 to 10,000 Dalton, are employed as polysaccharide X. On the other hand, the number m of the polysaccharide units X introduced in the polysaccharide A should be sufficiently high to ensure a corresponding hydrophilization of the compound. The magnitude of the number m essentially depends on the size of the polysaccharide A and the number of its free amino groups. Upon phagocytosis in the macrophage, the polysaccharides X are quickly hydrolyzed in lysosomes and secreted by the kidneys, i.e., not stored. The known enzyme inventory of macrocytic lysosomes can hydrolyze the amine and/or amide linkage between A and X depending on the nature of A and X on the one hand and the magnitude of m on the other. The released hydroxyethyl starch molecules are then clearly below the exclusion threshold of the kidneys (60,000 Dalton).

Depending on their calculatable and measurable physico-chemical properties, the bonding products (I) according to the invention can be used as infusible drugs with indications as virostatic agent, antibiotic, especially antimycotic agent, as ion exchanger, adsorption medium of charged particles and molecules, and as a colloidal blood substitute and anticoagulant. Important physico-chemical properties are the viscosity, dynamic viscosity, colloid-osmotic pressure, electrical conductivity, electrical impedance, thermal stability and autoclavability of the solutions as well as the optical transmission, absorption, behavior during the performance of an electrophoresis, adsorptivity and water-binding capacity. The solution of a bonding product (I) according to the invention is preferably thermally stable and autoclavable. For adsorption, the bonding products (I) according to the invention preferably have a sufficient binding capacity for the substance to be adsorbed. The adsorptivity for charged particles may also be estimated by electrophoresis.

According to the invention, the bonding product (I) may be substituted by having residues of formula (II) covalently bound to X —Z1cR1     (II)

and/or by having residues of formula (III) covalently bound to A

—Z2dR2     (III), wherein R1 is a pharmaceutically active molecular residue, R2 is a pharmaceutically active molecular residue, and R1 and R2 may be the same or different, and wherein Z1 is a linker that is covalently bound to both R1 and X, Z2 is a linker that is covalently bound to both R2 and A, c=1 or 0, d=1 or 0, and wherein the molar ratio of the residue of formula (II) to X is a, the molar ratio of the residue of formula (III) to A is b, a is an integer of from 0 to 1000, b is an integer of from 0 to 1000, and at least one of a and b is not zero.

Preferably, a=1, 2, 3, 4 or an integer of up to 150, 350 or 750. Preferably, b=1, 2, 3, 4 or an integer of up to 150, 350 or 750.

As pharmaceutically active molecules R to be bound as R1 and/or R2 to the bonding product (I), all substances may be used that can be bound covalently to the bonding product (I) according to the invention, i.e., have a functional group that is able to react with a complementary functional group of X and/or A, for example, to form a carboxylic acid ester, carboxylic acid amide and/or urethane depending on the functional group. Pharmaceutically active molecules that are able to form carboxylic acid esters with the bonding product (I) are preferred. More preferably, R1 and/or R2 are selected from the group consisting of amino acid residues, peptide residues and protein residues.

More preferably, R is selected from the group consisting of antibiotics, chemotherapeutics, cytostatic agents, antigens, oligonucleotides, mediators, false metabolic substrates and cytotoxic substances. These medicinal substances are covalently bound to the bonding product (I) and phagocytosed by macrophages.

For the covalent bonding of R to X, and to A, two binding possibilities are available, in principle. R may undergo binding to a free amino group of chitosan. R may also bind to one of the hydroxy groups of X and/or A.

Proceeding from an underlying polysaccharide X and/or A bearing amino groups (—NH2), the binding of pharmaceutically active substances R can be performed for R having functionalities selected from
carboxy (—COOH);
carboxylic acid halide (—C(O)Cl, —C(O)Br and/or —C(O)I);
carboxyalkylene (—(CH2)q-COOH, with q=1 to 10); or
ester groups (—COOAlk, wherein Alk is an alkyl group having from one to seven carbon atoms).

Conversely, X and/or A having these functionalities can undergo binding to pharmaceutically active substances R bearing hydroxy groups (—NH2).

Proceeding from an underlying polysaccharide X and/or A beating hydroxy groups (—OH), the binding of pharmaceutically active substances R can be performed for R having functionalities selected from
isocyanate (—NCO);
carboxy (—COOH);
carboxylic acid halide (—C(O)Cl, —C(O)Br and/or —C(O)I);
carboxyalkylene (—(CH2)q-COOH, with q=from 1 to 10); or
ester groups (—COOAlk, wherein Alk is an alkyl group having from one to seven carbon atoms).

Conversely, X and/or A having these functionalities can undergo binding to pharmaceutically active substances R bearing amino groups (—OH).

If c=0, R1 is preferably bound directly to X through a carboxylic acid ester, carboxylic acid amide and/or urethane bond. If d=0, R2 is preferably bound directly to A through a carboxylic acid ester, carboxylic acid amide and/or urethane bond.

In a further embodiment of the invention, additional bi-, tri- or polyfunctional molecules may be employed to form a linker that forms the linkage between the pharmaceutically active substance R and X and/or A.

Suitable starting compounds for linkers Z1 and/or Z2 are selected from linear or branched, saturated or unsaturated, aliphatic or alicyclic hydrocarbyl residues with from 1 to 22, preferably from 2 to 15, more preferably from 3 to 8, carbon atoms; aryl, aryl-C1-C4-alkyl and aryl-C2-C6-alkenyl groups with from 5 to 12, preferably from 6 to 12, more preferably 6, carbon atoms in the aryl residue, which may optionally be substituted with C1-C6-alkyl and/or C2-C6-alkoxy groups; or heteroaryl, heteroaryl-C1-C4-alkyl and heteroaryl-C2-C6-alkenyl groups with from 3 to 8 carbon atoms in the heteroaryl residue and one or two heteroatoms selected from N, O and S, which may be substituted with C1-C6-alkyl and/or C2-C6-alkoxy groups; and wherein the starting compounds for the linker Z1 contain from 2 to 20 functional groups for forming the covalent bonds with R1 and X, and wherein the starting compounds for the linker Z2 contain from 2 to 20 functional groups for forming the covalent bonds with R2 and A, wherein said functional groups are in each case independently selected from:
hydroxy (—OH),
amino (—NH2),
carboxy (—COOH),
isocyanate (—NCO),
carboxylic acid halide (—C(O)Cl, —C(O)Br and/or —C(O)I),
carboxyalkylene (—(CH2)q-COOH, with q=1-10), or
ester groups (—COOAlk, wherein Alk is an alkyl group with from one to seven carbon atoms).

In a preferred embodiment, bifunctional molecules are employed to form a linker. Also preferred are trifunctional molecules for forming a linker. More preferred are bifunctional and trifunctional molecules for forming a linker that have identical functional groups.

Particularly suitable compounds include, for example, dicarboxylic acids, such as oxalic acid, malonic acid, succinic acid, glutaric acid, adipic acid, pimelic acid, azelaic acid, sebacic acid, maleic acid, fumaric acid, sorbic acid, phthalic acid, terephthalic acid, isophthalic acid, agaric acid, citric acid, and their C1-C10 alkyl esters, halides and anhydrides; diisocyanates, such as toluylene diisocyanate, bitoluylene diisocyanate, dianisidine diisocyanate, tetramethylene diisocyanate, hexamethylene diisocyanate, m-phenylene diisocyanate, m-xylylene diisocyanate, C1-C6 alkylbenzene diisocyanate, 1-chlorobenzene 2,4-diisocyanate, cyclohexylmethane diisocyanate, 3,3'-dimethoxydiphenyl-methane 4,4'-diisocyanate, 1-nitrobenzene 2,4-diisocyanate, 1-alkoxybenzene 2,4-diisocyanate, ethylene diisocyanate, propylene diisocyanate, cyclohexylene 1,2-diisocyanate, 3,3'-dichloro-4,4'-biphenylene diisocyanate, diphenylene diisocyanate, 2-chlorotrimethylene diisocyanate, butylene 1,2-diisocyanate, ethylidene diisocyanate, diphenylmethane 4,4'-diisocyanate, diphenylethane diisocyanate, 1,5-naphthalene diisocyanate, cyclohexane diisocyanate and isophorone diisocyanate; diols, such as ethylene glycol, propylene glycol, butylene glycol and neopentyl glycol, pentanediol-1,5, 3-methylpentanediol-1,5, bisphenol A, 1,2- or 1,4-cyclohexanediol, caprolactonediol (reaction product of caprolactone and ethylene glycol), hydroxyalkylate bisphenols, trimethylolpropane, trimethylolethane, pentaerythritol, hexanediol-1,6, heptanediol-1,7, octanediol-1,8, butanediol-1,4, 2-methyloctanediol-1,8, nonanediol-1,9, decanediol-1,10, cyclohexanedimethylol, di-, tri- and tetraethylene glycol, di-, tri- and tetrapropylene glycol, polyethylene and polypropylene glycols having an average molecular weight of from 150 to 15,000, trimethylolethane, trimethylolpropane and pentaerythritol; and/or diamines, such as 1,2-diaminoethane, 1,2- or 1,3-diaminopropane, 1,2-, 1,3- or 1,4-diaminobutane, 1,5-diaminopentane, 2,2-dimethyl-1,3-diaminopropane, hexamethylenediamine, 1,7-diaminoheptane, 1,8-diaminooctane, trimethyl-1,6-diaminohexane, 1,9-diaminononane, 1,10-diaminodecane, 1,12-diaminododecane, 1,2-diaminocyclohexane, 1,4-diaminocyclohexane, 1,3-cyclohexanebis(methylamine), 1,2-phenylenediamine, 1,3-phenylenediamine, 1,4-phenylenediamine, 4,4'-ethylenedianiline, 4,4'-methylenedianiline, 4,4'-diaminostilbene, 4,4'-thiodianiline, 4-aminophenyldisulfide, 2,6-diaminopyridine, 2,3-diaminopyridine, 3,4-diaminopyridine, 2,4-diaminopyrimidine, 4,5-diaminopyrimidine, 4,6-diaminopyrimidine.

The use of such linkers enables, among others, a combination of X and/or A with the pharmaceutically active molecular residues R1 and/or R2 if compounds hearing identical functional groups with those of X and/or A, for example, alcohols each, or that cannot directly react with one another to form a bond for some other reason are employed as the pharmaceutically active molecule R. Suitable linkers preferably form carboxylic acid esters, carboxylic acid amides and/or urethanes with both X and/or A as well as with the active substances R1 and/or R2. Particularly preferred are bonds with a bifunctional linker selected from carboxylic acid esters.

Advantageously, further special residues allowing a chemical bonding of the pharmaceutically active substance R1 may be introduced in X, for example, biotin, amino acids or residues bearing sulfide groups, such as cysteine.

According to the invention, as the pharmaceutically active molecule R to be bound to the bonding product (I) as R1 and/or R2, there may further be employed medicaments selected from the group consisting of anorexiants, anti-acidosis agents, amino acids (for example, histidine) or modified amino acids, analeptic/antihypoxemic agents, analgetics/antirheumatics, anthelmintics, antiallergic agents, anti-anemic agents, anti-arrhythmic agents, antibiotics/anti-infectives, antidementives (nootropics), antidiabetics, antidotes, antiemetics/antivertiginosa, antiepileptic agents, antihemorrhagic agents (antifibrinolytics and other hemostatics), antihypertensives, antihypoglycemic agents, antihypotonic agents, anticoagulants, antimycotic agents, antiparasitary agents (internal), antiphlogistics, antifussives/expectorants, arteriosclerosis agents, balneotherapeutics and agents for thermotherapy, beta blockers, calcium channel blockers and inhibitors of the renin-angiotensin system, broncholytics/antiasthmatics, cholagogues, and bile tract therapeutics, cholinergic agents, corticoids (internal), dermatological agents (internal), dietetic agents/nutrition therapeutics, diagnostic agents and adjuvants for diagnostics, diuretics, blood flow stimulants, withdrawal agents, enzyme inhibitors, enzyme preparations and transport proteins, fibrinolytics, geriatrics, gout remedies, influenza remedies, gynecological agents, antihemorrhoidal agents (proctologics), hepatic agents, hypnotics/sedatives, pituitary and hypothalamic hormones, regulatory peptides and their inhibitors, immunotherapeutics and cytokines, infusion and standard injection solutions, organ perfusion solutions, cardiac remedies, caries and parodontose remedies and other dental preparations, coronary agents, laxatives, lipid depressors, neural therapeutics, gastro-intestinal agents, migraine analgesics, mineral metabolism preparations, muscle relaxants, narcotics, parathyroid hormones, calcium metabolic regulators, osteoporosis agents, neuropathy preparations and other neurotropic agents, neurotransmitters (e.g., dopamine) or modified neurotransmitters, ophthalmic agents, otological agents, anti-Parkinson drugs and other agents against extrapyramidal disorders, psychotropic drugs, sinusitis agents, roborants/tonics, thyroid therapeutic agents, sera, immunoglobulins and vaccines, sexual hormones and their inhibitors, spasmolytic agents, platelet-aggregation inhibitors, anti-tuberculosis drugs, immunostimulants, urological agents, vein therapeutics, vitamins, wound treating agents, cytostatic agents and metastasis inhibitors. That is to say, R1 and/or R2 are based on a medicament selected from the above mentioned group.

More preferably, R is selected from inositol, digoxin and propofol.

In a further modification, R is selected from the group of neuraminic acid compounds.

The bonding products (I) according to the invention may be used as a biocompatible, i.e., body-tolerated, material. Preferably, they are employed as implants, surgical adjuvants or components in medicinal devices.

Preferred uses as an implant are long-term or short-term implants, such as artificial blood vessels, vascular implants, artificial heart valves, heart mitral valves, tendons and ligament substitutes, cartilage substitutes or patches for closing undesirable openings during surgical interventions and wound covers.

Preferred uses as surgical adjuvants are surgical tools, disposable articles that are employed intracorporeally on a short-term basis, catheters, catheter tubes, suture material, biodegradable suture material, syringes, extracorporeal blood tubes, blood bags or bags for solutions for intravenous applications, or bag sheets.

Preferred uses as components in medical devices are parts of heart-lung and dialysis machines or filters, blood bags, infusion tubes, peristaltic pumps or dialysis membranes.

Also preferred is the application thereof as a material for contact lenses, as a cosmetic additive for hair conditioners, moisturizing cream or nail polish, for the immobilization of cells and enzymes, as carriers for affinity chromatography and protein separation, for controlled therapeutical systems (controlled drug delivery systems), for systems for selective drug release or for use in technologies for tissue cultures in vitro (tissue engineering).

Particular indications for the bonding products (I) according to the invention are in the provision of microspheres within the scope of immunological applications and, when bonded to other medicinally active compounds, as a carrier material for the modulation of drug activities. The bonding products (I) according to the invention enable the use of a component of dimensionally stable exoskeletons that is widespread in biology (in crustaceans, insects and fungi) as a scaffold for blood vessels and implants that is completely biodegradable depending on the degree of substitution of polysaccharide X and the further mutual cross-linking of chitin compounds A. Another cross-linking of the chitin components is possible, for example, by incorporating bivalent linker molecules as stated above before and after the introduction of X. For such a use, the implants may also be shaped by electrostatic aggregation to electrically charged bodies.

In principle, any electrostatically chargeable body or conductor may be used as an electrically charged body that does not react electrochemically with the chitosan film to be aggregated. Silver, platinum and gold are primarily suitable as the electrode material. In the following, a screen of a cathode ray tube suitable as an aggregation surface and an electrically charged rotating support plate that can be used as electrically charged bodies are explained.

The bonding product (I) preferably obtainable by a two-step reaction of a chitin or chitosan A with a polysaccharide X.
In the case where:
(a) the bonding is an amine linkage, the process comprises the following steps:
reacting the polysaccharide A with polysaccharide X to form an imine; and
subsequently reducing the imine to the corresponding amine; or
in the case where:
(b) the bonding is an amide linkage, the process comprises the following steps:
oxidizing the aldehyde group of polysaccharide X; and
subsequently reacting the oxidation product with polysaccharide A.

In (a), in the first step, the amino group of chitin or chitosan A reacts with the terminal aldehyde group of polysaccharide X to form a Schiff base. In a second step, the Schiff base is reduced to the corresponding amine with a reducing agent. The reduction of the imine to give the amine is well-known to the skilled person and is performed under the known conditions. Suitable reducing agents include, for example, salt-like hydrides, such as LiAlH4, LiBH4, NaBH4 or NaBH3CN. However, other reducing agents known to the skilled person may also be employed.

To form an amide linkage (b), the aldehyde group of the polysaccharide X is oxidized first, and the oxidation product obtained, which is a lactone and/or a carboxylic acid, is reacted in a subsequent step with a polysaccharide A to form a carboxylic acid amide (from a reaction of the lactone and/or carboxylic acid with the amino group of polysaccharide A). For oxidation, any suitable process known to the skilled person may be used. Preferably, a process by Hashimoto (described in Hashimoto et al., Kunststoffe, Kautschuk, Fasern, Vol. 9 (1992), p. 1271-1279) is used in which a reducing aldehyde end group of a saccharide can be selectively oxidized to obtain a reactive ester (lactone). The terminal aldehyde group of polysaccharide X is preferably oxidized selectively by reaction with iodine in the presence of aqueous potassium hydroxide. Preferably, a 0.1 N iodine solution and/or a 0.1 N KOH solution are used as reagents. In a preferred embodiment of the invention, the reaction takes place in organic solvents, such as DMSO or ethyldimethylaminopropyl carbodiimide.

In the preparation of the bonding product (I) according to the invention to form a Schiff base (step 1 of (a)), it must be considered that both chitin/chitosan A and polysaccharide X have a reducing end group in the molecule. Therefore, in the synthesis of the compounds according to the invention, the reducing end groups of the chitin and chitosan compounds A must be prevented from reacting themselves with the nitrogen atom of a chitin and/or chitosan A. This reaction of the terminal aldehyde groups with the amino groups of chitosan is preferably hindered to a very high extent by the formation of a chitosan and/or chitin film. This would form coupling products that compete with the binding products (I).

Although the equilibrium in the first step can be shifted in favor of the formation of bonding product (I) by using chitosan that has not been dissolved in organic solvents, the thus formed compounds remain in greater aggregates and clusters, whereby further desired reactions are strongly deteriorated by the steric hindrance. For example, it becomes almost impossible to perform a regioselective functionalization of compounds that have formed such aggregates or clusters.

The aggregate and cluster formation can be avoided in an acidic medium since chitosan is readily soluble in acids, for example, acetic acid. Polysaccharide A is preferably dissolved in a solvent that is selected from the group consisting of diluted weak organic and inorganic acids, the solvent having a pH of less than 6.5, preferably less than 5.5 and more preferably less than 5.0. Most preferably, the pH is within a range of from 2.0 to 6.0. Particularly preferred are solvents that are degradable in the human and/or animal metabolism, such as acetic acid and lactic acid.

A chitosan solution is applied to a support to form a thin film. Since the chitosan film formed is to serve as a solid matrix for the further reactions and the formation of Schiff bases is disturbed by residual acid in the solution, the latter must be removed as completely as possible. This is done by washing the film, for example, with distilled water or phosphate buffer with a pH of greater than 7.0. The polycation chitosan, which is still soluble at a low pH, is prevented from being washed off the support plate by the strong negative charge on the support plate according to the invention. In contrast, for positively charged plates, the chitosan film could be frequently observed to float away completely. The same could be observed for correspondingly positively polarized cathode ray tubes. In addition, to avoid washing off of the chitosan, the eluent is applied in rotation from peripheral to central. The pH of the effluent elution solution reveals the completeness of removal of the acidic organic solvent.

Another possibility for removing the solvent is preferably the evaporation of the acetic acid employed as the solvent and/or a further solvent.

Preferably, a solvent is used that does not react with one of the starting materials or products. In particular, solvents that have no functional groups disturbing the formation of Schiff bases, such as carboxy groups, should be employed.

In a preferred embodiment of the invention, dichloromethane, tetrahydrofuran, methanol, ethanol, dimethyl sulfoxide or mixtures thereof are used as the solvent in the first and/or second step of the reaction. Dichloromethane is particularly preferred as the solvent for the first step of imine formation. For the second step of the reduction, methanol is particularly preferred as the solvent.

For the first reaction step and thus for the preparation of the compounds according to the invention, the surface structure of the prepared chitosan films is of critical importance. The formation of aggregates and clusters must be essentially avoided when the film structure is prepared. Thin or one-layer chitosan films are particularly preferred. Thin and/or one-layer films enable a higher yield of the bonding product (I). In addition, an evaluation of the further covering density by optical means, such as lasers and fluorescence detectors, optical and electron microscopes, becomes possible.

The process according to the invention results in chitosan films having few irregularities. In contrast, the microscopical evaluation of the chitosan films prepared by dipping or stripping shows strong irregularities of the film structure obtained. Also, the leaking of the organic solvent with distilled water or phosphate buffers additionally caused corrugation and detachment of the films prepared. In contrast, if the solvent is removed only after the film has been dried, the formation of cracks and microscopically visible irregularities is promoted.

By centrifuging film-forming structures on rotating support plates, very homogeneous films with a selectable layer thickness can be prepared. However, in this process, the position and orientation of the amino groups of the chitosan molecules A is largely left to chance. During the film formation, the amino groups may be facing the support plate or the free surface. In the following first reaction step, because of steric hindrance, only those amino groups that are facing the free surface will be able to react with the aldehyde of polysaccharide X.

According to the invention, the position and orientation of the amino group in its protonated form (ammonium group) is controlled by charging the surface of the support plate electrostatically. On a positively charged surface, the chitosan molecules will orient themselves in such a way that the ammonium groups are facing away from the surface of the support plate because of electrostatic repulsion.

The maximum thickness of the chitosan film according to the invention is one in which the orientation of the cationic groups is just still determined by the electric charge pattern of the support plate. For thicker chitosan films, the orientation of the protonated groups is only determined by mutual interactions of the chitosan molecules. Therefore, the maximum allowable layer thickness depends on the degree of electric polarization of the support plate.

The arrangement of the chitosan molecules due to the orientation of their ammonium groups is retained when the chitosan undergoes transition to its insoluble form during the removal of the acidic solvent, in which the amino groups are not protonated and thus do not bear any more positive charge.

In one embodiment, the surface of the support plate is charged electrostatically by means of cathode rays.

In the (solid) chitosan film obtained, significantly more amino groups are oriented away from the surface of the support plate than are oriented towards it. A liquid in which a polysaccharide X is dissolved or suspended is added to the film. The solution preferably has a pH in a range in which the chitosan is not dissolved and in which its amino groups are not in a protonated state. Preferred is a pH range of 6.5 or higher, preferably within a range of from 6.8 to 10, more preferably of 7.0 or higher, even more preferably of from 7.5 or higher to 8.0. The solution preferably includes a buffer, more preferably a phosphate buffer.

By agitating the support plate, preferably by rotating or vibrating, the contact between the polysaccharides A and X that are to react with one another is optimized. When the polysaccharide X has reacted completely with chitosan A or when the equilibrium to be reached has been reached, after about 30 minutes, excess polysaccharide X is removed.

Another embodiment includes the binding of carboxymethyl-substituted polysaccharide X to chitosan. In addition to the terminal aldehyde group of the polysaccharide molecule, one of the carboxy groups may also react to form a Schiff base with the amino group of chitosan.

For characterizing the compound, the polysaccharide may also be substituted with fluorescein or other markers in addition to hydroxyethyl or carboxymethyl groups.

By a second step in which the Schiff base formed is reduced to the corresponding amine under conditions well known to the skilled person, the bonding product (I) is obtained. Preferably, a salt-like hydride is employed for reduction, more preferably lithium aluminum hydride (LiAlH4), lithium borohydride (LiBH4), sodium cyanoborohydride (NaBH3CN) or sodium borohydride (NaBH4).

In one embodiment, the hydroxy groups of hydroxyethyl-substituted polysaccharides X may react with dicarboxylic acids or dicarboxylic acid halides whereby the bound polysaccharide residues are cross-linked or cross-linked polysaccharide X is reacted with chitosan A. For the cross-linking, oxalic acid, malonic acid, succinic acid, adipic acid and their halides are suitable others. The esterification can be effected in accordance with the reaction to the bonding product (I), wherein intermolecular cross-links can be utilized as structural components.

If A is present as a film or bound as particles, according to the invention, the polysaccharide molecules X may be isolated to any distance desired depending on their concentration, the number of deacetylated free amino groups of A and their charge patterns on the stationary structure of A, so that the mutual distance of the individual bound molecules of polysaccharide X in the bonding product (I) can be chosen freely depending on the distribution of the amino groups of A. When the distances between the individual polysaccharide residues bound to A are sufficiently large, there is no cross-linking when, for example, dicarboxylic acid halides are added. Instead, pharmaceutically active substances may be bound to X to form linkers without resulting in cross-linking, which would be undesirable in this case. This embodiment preferably uses chitin and/or chitosan molecules A having a sufficiently large MW of >800,000 and polysaccharides X having a relatively low MW of <150,000, wherein A is preferably in excess.

In one embodiment, the process according to the invention includes the following further step:

Substitution of X with a residue of formula (II)

$$-Z1cR1 \qquad (II)$$

and/or

Substitution of A with a residue of formula $$-Z2dR2 \qquad (III)$$

wherein R1 is a pharmaceutically active molecular residue, R2 is a pharmaceutically active molecular residue, and R1 and R2 may be the same or different, and wherein Z1 is a linker that is covalently bound to both R1 and X, Z2 is a linker that is covalently bound to both R2 and A, c=1 or 0, d=1 or 0, and wherein the molar ratio of the residue of formula (II) to X is a, the molar ratio of the residue of formula (III) to A is b, a is an integer of from 0 to 1000, b is an integer of from 0 to 1000, and at least one of a and b is not zero.

A special case of the synthetic process for introducing medicinal substances is substitution of the bonding product (I) in which residues of the above stated formula (II) are covalently bound to X, wherein in a further step A and X are separated by cleaving the amine and/or amide linkage. In other words, after the substitution of X with a residue of formula (II), X and A are separated from each other in a further step. The skilled person knows the conditions under which a selective cleavage of the A-X linkage can be performed conveniently, i.e., without or with little deterioration of the structure of X to which residues of formula (II) are bound. Depending on R1 and the linkage between X and A, suitable methods include, but are not limited to, hydrolysis in alkaline media, optionally in the presence of a metal catalyst, enzymatic hydrolysis, preferably the use of proteases and von Braun amine cleavage.

The products of such cleavage reactions are at least the polysaccharide X substituted with residues of formula (II), corresponding to the compounds described as modified colloids in EP-A-1 230 935. Thus, the process according to the invention is an improvement of the process of or an intermediate step in the production of the compounds described in EP-A-1 230 935. According to this process, polysaccharides are regioselectively substituted with medicinally active substances or residues by isolation and orientation of the polysaccharides on a chitosan film by covalently bonding the terminal aldehyde group of the polysaccharide with a free amino group of a chitosan film oriented according to its electric charge to form a Schiff base. The process may be performed and controlled by the device.

In a further step, it is possible to introduce the substances R1 and/or R2 regioselectively into the bonding product (I), optionally using a linker. For the regioselective introduction of substituents, the compound can be aggregated in a charge-dependant way to electrode structures having a very complex charging pattern. The charge-dependant orientation of the film-forming chitosan molecules can be influenced by aggregation to electrically charged planar nanostructured electrodes. Such nanostructured printed circuits can be burned into electrodes under high vacuum by electron-microscopical methods.

In addition to the choice of the degree of deacetylation of polysaccharide A, i.e., the number of its reactive amino groups, the isolation of the polysaccharides X to be bound to polysaccharide A may also be influenced by means of macromolecules aggregating to polysaccharide X through intermolecular attractive forces before the reaction of polysaccharide A with polysaccharide X to form the bonding product (I) and thus functioning as spacers between the individual molecules of polysaccharide X. Suitable is any macromolecule that can aggregate to a polysaccharide X and form great aggregates of parallel molecules and that at the same time has no functional groups that would enable it to react with polysaccharide X and/or polysaccharide A to form a covalent bond under the reaction conditions of the following process steps. That is to say, for the aggregation of macromolecules that are not to be covalently bound in a bonding product (I), those macromolecules, especially polysaccharides, may be used that on the one hand cannot undergo a covalent bond with the amino groups of chitosan to form a Schiff base and that on the other hand have sufficiently strong intermolecular attractive forces towards polysaccharide X.

It is known that very strong intermolecular attractive forces are acting kappa-carrageenan and acemannans, which causes the two polysaccharides to aggregate together. Thus, for example, kappa-carrageenans can form aggregates of parallel molecules with acemannans, like in a particular embodiment. According to the invention, the polysaccharide X forms aggregates of parallel molecules with macromolecules, preferably kappa-carrageenan, glycoproteins or macromolecules from cell membranes, in a step upstream from the formation of a bond between X and A. Such macromolecules should not contain any functional groups that would enable them to react with polysaccharide X and/or polysaccharide A to form a covalent bond under the reaction conditions of the following steps.

According to the invention, the terminal aldehyde groups of kappa-carrageenan can be reduced at first in the absence of chitosan molecule A, for example, by reaction with salt-like hydrides, such as sodium borohydride. The kappa-carrageenan without a reducing aldehyde group can subsequently form greater clusters with the acemannans. During the reaction of the acemannan with the amine groups of polysaccharide A, the kappa-carrageenan serves as a spacer without becoming covalently bound to the amine groups. A cramped occupation of the amine groups of the polysaccharide A by acemannan is sterically hindered. Before the medicinally active substances R1 and/or R2 are incorporated, these reduced polysaccharides must be eluted.

According to the invention, galactomannans and/or galactoglucomannans may also be used as polysaccharide X, and kappa-carrageenan in which the aldehyde group has been removed or protected may be used as a macromolecule for isolation and/or pattern generation.

If kappa-carrageenan as polysaccharide X is to be hound to polysaccharide A, this may be effected by the mixing ratio of the individual polysaccharides that may be used as polysaccharide X. However, an aggregation to macromolecules that are not to be incorporated into the bonding product (I) according to the invention, but are eluted after the reaction of A and X to form the bonding product (I), may also be sought.

In a particular embodiment, macromolecules synthesized by microorganisms or cells may be utilized as spacers that aggregate to polysaccharide X, after their functional groups that can react with those of polysaccharides X and/or A have been removed and/or protected with protective groups, in order to sterically influence the incorporation of polysaccharides X into a bonding product (I) according to the invention. Such macromolecules include polysaccharides and glycoproteins from the cell membranes of bacteria, fungi and yeasts.

When polysaccharides X having a high tendency to intermolecular binding forces, such as van der Waals forces, are used, the bonding product (I) can be provided with a high affinity for the non-reducing biological structures employed for exerting a steric influence.

In one embodiment, the further substitution of X and/or A is influenced by complexing with metals as well as by electrodes and other electrochemical means.

The bonding products (I) have a variance of the molecular weight and of the charge distribution in the molecule and additionally are also distinguished from the starting materials by their molecular weight and charge distribution in the molecule. Therefore, a separation of the starting materials from the reaction products and/or a purification of the reaction products by gel permeation chromatography and/or electrophoresis is possible, wherein the reaction products are purified and/or separated from the starting materials in accordance with their size (more precisely: their hydrodynamic volume) and/or their electrophoretic mobility.

In one embodiment of the invention, a medicinal substance R3 is coordinatively bound (complexed) to the bonding product (I). R3 is preferably a metal ion. More preferably, R3 is iron, preferably FeII, potassium, magnesium, zinc, calcium, gadolinium and/or copper.

According to the invention, the complexing bonding product (I) can be selected in such a way that the complex can release R3 in the body in order to supply a trace element or important mineral. In another embodiment, the complexing bonding product (I) is selected in such a way that the complex cannot release R3 in the body, for example, in order to enable the application of the complex as a contrast agent, preferably with R3=gadolinium.

The device according to the invention is preferably used for the preparation of the bonding product (I). The device according to the invention comprises an electrostatically chargeable support plate 1 made of an insulating material, such as glass, plastic or amber, so that an electric field can form by electrostatic charging of the support plate 1. By means of the device according to the invention, nanostructured surfaces can be produced from the liquid phase. Further, surfaces may be selectively functionalized geometrically in order to fix specific molecules or microscopic particles electrostatically. By means of electrostatic structuring, particles that are in liquids, for example, dissolved chitosan molecules, can be moved and selectively positioned by means of electric fields.

In a particular embodiment of the process according to the invention, the process comprises the following steps: applying a solution or suspension of chitosan or chitin A to the support plate (1); charging the support plate (1) electrostatically to form an electric field; preparing a chitosan or chitin film; reacting the chitosan or chitin A by contacting the chitosan or chitin film with a solution or suspension of polysaccharide X at a pH of greater than 6.8 to form a Schiff base; reducing the Schiff base by adding a reducing agent to obtain the bonding product (I). In a further step, the bonding product (I) may be reacted with R1 and optionally Z1 and/or with R2 and optionally Z2 to obtain the bonding product (I) substituted with residues of formula (II) and/or (III). Subsequently, the following step may be performed: reacting the bonding product (I) substituted with at least residues of formula (II) to cleave the amine linkage and/or amide linkage between A and X to obtain at least polysaccharide X substituted with residues of formula (II).

In one embodiment, the support plate 1 may be rotatable, wherein the revolutions per minute of the rotation can be adjusted controllably by means of a motor and established by means of a revolution counter. The support plate 1 is preferably planar. In another embodiment, the support plate has a concave design and thus forms a vessel.

Concavely curved support plates enable chemical reactions to be performed in the reaction vessel generated by the curvature. The mixing of the added reagents can be effected by slowly rotating the vessel without detachment or disturbance of the film structures formed. By increasing the revolutions per minute, the reagents can be centrifuged off the edge, i.e., removed, without disturbing the film structures.

The support plate 1 can be charged electrostatically with measures known in the prior art. In one embodiment, one side of the rotating support plate can be approached to an insulatedly clamped paper surface and thus negatively charged electrostatically. An opposite positive charge is formed on the opposite side of the support plate.

Optionally, the support plate 1 can be electrostatically charged in a controlled way. In a further embodiment, electrodes are arranged in or on the surface of the support plate. By charging the electrodes, complex charge patterns can be formed on the surface of support plate 1. The electrodes are connected to a power generator. In a preferred embodiment, the support plate 1 is connected to the power generator through its axis. In one embodiment, the connection of a rotatable support plate 1 is effected through sliding contacts.

Optionally, a means for generating an electric charge is also capable of measuring this charge. In one embodiment of the invention, the device according to the invention comprises at least one means 2 for generating and measuring the electrostatic charge of the surface of the support plate, which means is capable of charging the top and bottom sides of the rotatable support plate electrostatically with different charges. In one embodiment of the invention, the device according to the invention comprises at least one means 3 for generating and measuring different charges on the surface of the support plate, wherein said means comprises a cathode that is connected in an electrically conductive way with the center of said rotatable support plate, and an annular anode on a circumference of the surface of the support plate, wherein said electrodes are connected to a power generator.

In one embodiment, an electrode is arranged above the center of the support plate. The electrode can be connected in an electrically conductive way with the chitosan film or the added reagents by approaching it to the support plate. In a preferred embodiment, the electrode material is graphite.

In another embodiment of the process, the support plate does not have a rotatable design, but the support plate coated with a chitosan film is arranged on the screen of at least one cathode ray tube. Preferably, the support plate is designed as a reaction vessel on the screen of the cathode ray tube. By an appropriate modulation of the cathode ray by deflecting plates and/dr deflecting coils, specific charge patterns can be produced on the surface of the support plate that specifically influence both the aggregation of the positively charged amino groups of the chitosan and the subsequent chemical reactions, i.e., electron displacements and oxidoreductions.

Advantageously, structures recorded with imaging methods, such as electron microscopy, can be recurred to for producing a specific charge distribution on the support plate integrated into said cathode ray tube. In a particular embodiment of this method, the cathode ray can be deflected by deflection coils onto an inspection window, so that the charge pattern incident on the support plate can be observed by deflection onto the inspection window. The distance between the cathode and the support plate may be smaller or greater than the distance between the cathode and the inspection window. By appropriately realizing the distances between the cathode and inspection window and between the cathode and support plate, the charge pattern generated on the support plate can be represented in magnification on an inspection window (at a further distance). By appropriately connecting both the imaging electron microscope and the cathode ray tube charging the support plate to a computer and observing the structures prepared on the support plate with the connected electron microscope, the two systems can be matched to one another. Preferably, the cathode ray and the means for controlling and deflecting it are connected to a computer that obtains information from an electron microscope or another imaging device.

The device according to the invention may further comprise means 6 for transilluminating the support plate 1 as well as light detectors for measuring the light passing through the support plate 1. In one embodiment, the device comprises means for illuminating the surface of the support plate as well as light detectors for measuring the light reflected by the support plate. Independently thereof, the device may comprise means for magnetizing the films formed on the surface of the support plate and for measuring the magnetic fields on the surface of the support plate. The means is preferably arranged movably above and/or below the support plate. Preferably, it can be moved into at least one direction relative to the support plate, for example, by means of a step motor 61 and a shaft 62.

Preferably, the device comprises a pipetting or dosing means 4 provided above the center of the support plate 1, whose distance to the support plate 1 can be changed. Optionally, the device comprises further dosing means whose distance from the center of the support plate can be selected, wherein their heights above the support plate can also be changed controllably.

Figure 1:
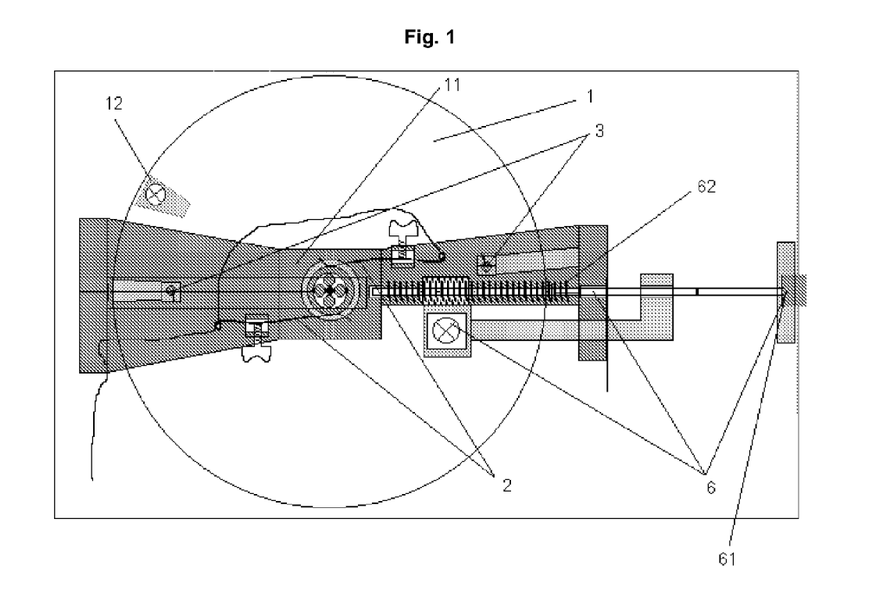
FIG. 1 shows a top plan view of an illustrative embodiment of a device used in the preparation of the bonding product (I) and derivatives according to the invention.
Figure 2:
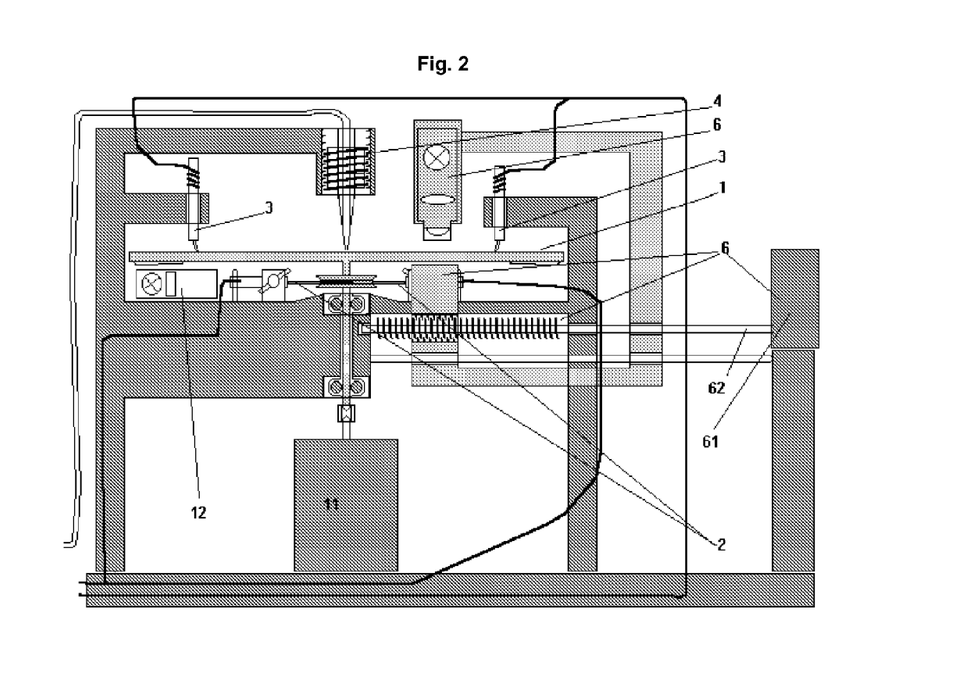
FIG. 2 shows a cross-sectional view of the same embodiment.

FIG. 1 shows a top plan view of an illustrative embodiment of the device according to the invention. FIG. 2 shows a cross-sectional view of the same embodiment in which:
1. is a support plate that can be charged electrostatically in a controllable way and can rotate with an adjustable revolutions per minute;
2. is a means for producing and measuring the electrostatic charge of the surface of support plate 1, for example, by different electrostatic charging of the top and bottom sides of said rotatable support plate;
3. is a means for producing and measuring different charges on the surface of support plate 1, for example, by incorporating a cathode that is connected in an electrically conductive way with the center of the rotatable support plate, and an annular anode on a circumference of the surface of the support plate, wherein said electrodes are connected to a power generator;
4. is a pipetting or dosing means provided above the center of the support plate 1, whose distance to the support plate can be changed; and
6. is a means for transilluminating the support plate 1 as well as light detectors for measuring the light passing through the support plate 1, wherein said means 6 comprises a step motor 61 and a shaft 62;
11. is a motor that can drive said rotatable support plate; and
12. is a revolution counter.

The invention is further illustrated by the subsequent Examples without being limited thereto, however.

Examples

Example 1

10 mg of highly viscous chitosan (2-amino-2-deoxy-(1→4)-β-D-glucopyranan) (Fluka Biochemika) is dissolved in 12 ml of distilled water. Subsequently, 0.5 mg of HES 200/0.5 labeled with fluorescein isothiocyanate (FITC), prepared according to DeBelder and Granath, and having a DS for fluorescein of 0.02 is dissolved in 1.5 ml of a 0.1 N phosphate buffer solution, pH 7.5, and admixed with shaking in the dark. After 30 Minutes, 0.025 g of sodium cyanoborohydride NaBH3CN (Acros Organics, N.J.) is added, the mixture is shaken and allowed to stand at room temperature in the dark for 2 hours. The reagent is shaken manually every 30 minutes until bubbles cease to rise. After 120 minutes at the latest, the same amount of 0.025 g of sodium cyanoborohydride is again added, and the mixture is treated in the same way. The same procedure is performed with a control solution having the same composition, but without adding sodium cyanoborohydride.

After 72 hours, both reagents are dialyzed and freeze-dried. The mixture reacted with sodium cyanoborohydride shows a clear yellowing of the chitosan granules, while the granules not treated with sodium cyanoborohydride have no visible coloring. When illuminated with a fluorescence lamp (wavelength 540-590 nm), a fluorescent yellow color can be observed. Subsequently, both freeze-dried reagents are exposed to a strong electric field of a negative charge. The dry substance not admixed with sodium cyanoborohydride is immediately attracted by the electric field. The substance admixed with sodium cyanoborohydride according to the invention is not in a charged form (polycation) and therefore is not influenced by the electric field.

Example 2

10 mg of highly viscous chitosan (2-amino-2-deoxy-(1→4)-β-D-glucopyranan) (Fluka Biochemika) is dissolved in 10 ml of distilled water. Subsequently, 0.5 mg of FITC-labeled HES 200/0.5, prepared according to DeBelder and Granath, having a DS for fluorescein of 0.02 is dissolved in 1.5 ml of a 0.1 N phosphate buffer solution, pH 7.5, and admixed with shaking in the dark. After 30 Minutes, 0.025 g of sodium cyanoborohydride NaBH3CN (Acros Organics, N.J.) is added. The mixture is shaken and allowed to stand at room temperature in the dark for 2 hours. The reagent is shaken manually every 30 minutes until bubbles cease to rise. After 120 minutes at the latest, the same amount of 0.025 g of sodium cyanoborohydride is again added, and the mixture is treated in the same way.

Example 3

2 g of low viscous chitosan (2-amino-2-deoxy-(1→4)-β-D-glucopyranan (Fluka Biochemika) is dissolved in 50 ml of 2 N acetic acid with shaking. The mixture is allowed to stand for 36 hours until no more air bubbles are visible. A planar glass slide is clamped into the film centrifuge shown in FIG. 1. The pipetting means provided above the center of rotation of the film centrifuge is filled with the chitosan solution. The centrifuge is rotated with 200 rpm and negatively charged with a generator. The pipetting means is slowly approached to the rotating support plate. At first, 200 μl of the chitosan solution is applied to the center of the support plate and distributed as a film on the support plate by increasing the number of revolutions. The radius of the circular film structure is determined with a lamp and measuring means provided above the film centrifuge. The number of revolutions of the centrifuge is increased until the radius of the formed film increases no longer. The film is dried at 300 rpm for more than 12 h.

The film is washed with water at a revolutions per minute of 150 rpm, beginning at the outer periphery of the film until the dripping washing solution has a neutral pH. 3 ml of phosphate buffer is added to the support plate. 5 g of an HES-460 is completely dissolved in 7 ml of water and added to the support plate. After 30 minutes, 0.025 mg of sodium cyanoborohydride NaBH3CN (Acros Organics, N.J.) is added. The mixture is slowly rotated for 30 min and allowed to stand at room temperature for 2 hours. Thereafter, the reagent is rotated every 30 minutes for a period of 10 minutes until bubbles cease to rise. After 120 minutes at the latest, the same amount of 0.025 g of sodium cyanoborohydride is again added, and the mixture is treated in the same way. After 72 hours, the reagents are centrifuged off above the support plate, the preparation is washed repeatedly with phosphate buffer, pH 7.5, dried and examined by electron microscopy. The same procedure is performed with a support plate having the same charge, but without adding sodium cyanoborohydride.

Figure 3:
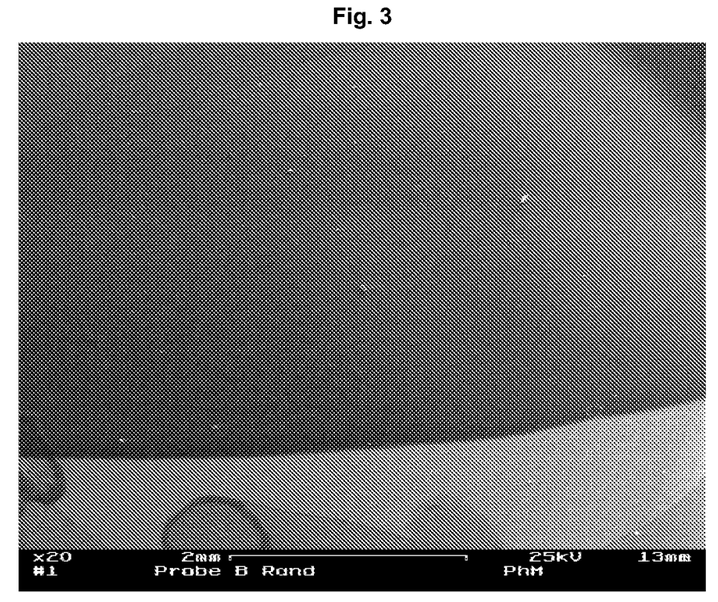
FIG. 3 shows a chitosan film prepared with the device according to the invention.
Figure 4:
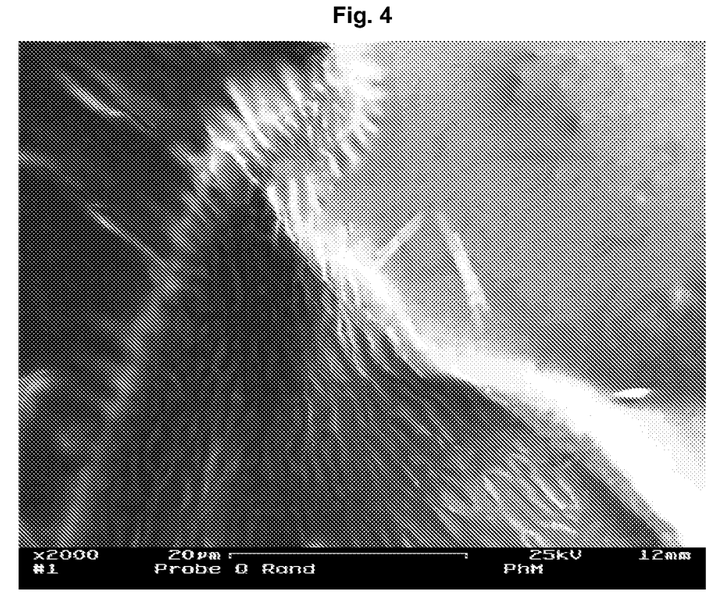
FIG. 4 shows the chitosan film after the process according to the invention has been performed.

When sodium cyanoborohydride is reacted, it can be observed that the formation of bubbles occurs almost exclusively in the marginal zone of the sample. FIG. 3 shows the chitosan film of Example 3 formed without the addition of sodium cyanoborohydride. FIG. 4 shows a chitosan film after the process according to the invention has been performed in Example 3. In the marginal zone of the preparation, clear changes and corrugations are found, which cannot be observed in the middle zones of the film. The substantial limitation of this change to the marginal zone of the film could be observed only when the support plate was negatively charged. These observations show that the electric polarization of the support plate caused an orientation of the cationic groups of the chitosan molecule towards the plate and was thus available for the reaction according to the invention only in the marginal zone. When the support plate was negatively charged, the formation of bubbles after adding sodium cyanoborohydride could also be observed only in the region of the marginal zone.

Example 4

5 g of chitin is suspended in 2 N acetic acid with shaking. The mixture is allowed to stand until air bubbles cease to rise, and flushed with nitrogen in a three-necked flask. Subsequently, 250 ml of 0.5 N NaOH is slowly added. The mixture is heated at 95° C. for 20 minutes. The residue is washed with an excess of water and dried at 80° C.

The chitosan formed is dissolved in 2 N acetic acid with shaking and centrifuged on a positively charged plate of the film centrifuge over 12 hours with 300 rpm using the device described in Example 3. Subsequently, washing is performed with water at a low revolutions per minute beginning at the periphery until the dripping washing solution has a neutral pH. The film on the support plate is taken up in 3 ml of phosphate buffer (pH 7.5). 1 g of an HES 130/0.5 is dissolved in 5 ml of H2O and pipetted onto the support plate.

After 30 minutes, 0.25 mg of sodium cyanoborohydride is added. The mixture is slowly rotated for 30 minutes and then allowed to stand for 2 hours. Thereafter, the support plate is slowly rotated for 10 minutes until bubbles cease to rise. After 120 minutes, 0.025 mg of sodium cyanoborohydride is again added, and the mixture is treated in the same way. After 72 h, the supernatant solution is centrifuged off, and the preparation is washed repeatedly with phosphate buffer and dried.

The support plate with the preparation is placed into a reaction vessel with a dropping funnel and a pH electrode and carefully coated with water. With diluted aqueous sodium hydroxide, a pH of from 8 to 8.5 is adjusted. 0.5 g of pyridine is carefully added, and the vessel is carefully shaken. Thereafter, 30 mg of malonic acid dichloride is added, and then the reaction vessel is slowly rotated. Subsequently, 50 mg of inositol is added. The reaction is allowed to stand at 60° C. for 2 hours. Thereafter, 30 mg of malonic acid dichloride is again added, and then 50 mg of inositol is added, and the mixture is again allowed to stand at 60° C. for 2 hours. This process is repeated another two times. Thereafter, the support plate is carefully washed with water and freeze-dried.

What is claimed is:

1. A bonding product (I) consisting of
m molecules of a polysaccharide X linked with a polysaccharide A through a linkage,
wherein said polysaccharide A is selected from the group of chitins or chitosans having a degree of deacetylation of not more than about 75%,
m is an integer of from 1 to 10,000, and
the linkage between polysaccharide X and polysaccharide A is an amine and/or amide linkage, characterized in that said polysaccharide X is starch, amylose and/or amylopectin partially or completely substituted with substituents selected from the group consisting of hydroxyethyl groups and carboxymethyl groups and characterized in that said bonding product (I) is substituted by having residues of formula (II) covalently bound to polysaccharide X and by having residues of formula (III) covalently bound to polysaccharide A, wherein formula (II) is —Z1$_c$R1 and formula (III) is —Z2$_d$R2 and
R1 is a pharmaceutically active molecular residue,
R2 is a pharmaceutically active molecular residue, and
R1 and R2 may be the same or different, and
wherein
Z1 is a linker that is covalently bound to both R1 and polysaccharide X,
Z2 is a linker that is covalently bound to both R2 and polysaccharide A,
c=1 or 0,
d=1 or 0, and
wherein
the molar ratio of the residue of formula (II) to polysaccharide X is a,
the molar ratio of the residue of formula (III) to polysaccharide A is b,
a is an integer of up to 1000,
b is an integer of up to 1000, and
both a and b are not zero.

2. The bonding product according to claim 1, characterized in that said polysaccharide X is a hydroxyethyl starch.

3. The bonding product according to claim 2, characterized in that
the molecular weight of said hydroxyethyl starch is below 30,000, its degree of substitution DS is smaller than or equal to 0.3, and m is between 15 to 50.

4. The bonding product according to claim 2, characterized in that the molecular weight of said hydroxyethyl starch is below 4000, and m is between 100 to 200.

5. The bonding product according to claim 2, characterized in that the molecular weight of said hydroxyethyl starch is below 1500, and m is between 300 to 750.

6. The bonding product according to claim 1, characterized in that said polysaccharide A is a chitosan having a degree of deacetylation within a range of from 75% to 60%.

7. The bonding product according to claim 1, characterized in that the starting compounds for linkers Z1 and/or Z2 are selected from linear or branched, saturated or unsaturated, aliphatic or alicyclic hydrocarbyl residues with from 1 to 22 carbon atoms; aryl, aryl-$C_1$-$C_4$-alkyl and aryl-$C_2$-$C_6$-alkenyl groups with from 5 to 12 carbon atoms in the aryl residue, which may optionally be substituted with $C_1$-$C_6$-alkyl and/or $C_2$-$C_6$-alkoxy groups; or heteroaryl, heteroaryl-$C_1$-$C_4$-alkyl and heteroaryl-$C_2$-$C_6$-alkenyl groups with from 3 to 8 carbon atoms in the heteroaryl residue and one or two heteroatoms selected from N, O and S, which may be substituted with $C_1$-$C_6$-alkyl and/or $C_2$-$C_6$-alkoxy groups; and
wherein the starting compounds for the linker Z1 contain from 2 to 20 functional groups for forming the covalent bonds with R1 and X, and
wherein the starting compounds for the linker Z2 contain from 2 to 20 functional groups for forming the covalent bonds with R2 and A,
wherein said functional groups are in each case independently selected from:
hydroxy (—OH),
amino (—NH$_2$),
carboxy (—COOH),
isocyanate (—NCO),
carboxylic acid halide (—C(O)Cl, —C(O)Br and/or —C(O)I),
carboxyalkylene (—(CH$_2$)$_q$—COOH, with q=1-10), or
ester groups (—COOAlk, wherein Alk is an alkyl group with from one to seven carbon atoms).

8. The bonding product according to claim 1, characterized in that c=0, and R1 is directly bound to X through a carboxylic acid ester, carboxylic acid amide and/or urethane bond.

9. The bonding product according to claim 1, characterized in that d=0, and R2 is directly bound to A through a carboxylic acid ester, carboxylic acid amide and/or urethane bond.

10. The bonding product according to claim 1, characterized in that R2 and/or R1 are selected from the group consisting of amino acid residues and peptide residues.

11. The bonding product according to claim 1, characterized in that R2 and/or R1 are a protein residue.

12. The bonding product according to claim 1, characterized in that R2 and/or R1 are based on a medicament selected from the group consisting of anorexiants, anti-acidosis agents, amino acids or modified amino acids, analeptic/antihypoxemic agents, analgetics/antirheumatics, anthelmintics, antiallergic agents, anti-anemic agents, anti-arrhythmic agents, antibiotics/anti-infectives, antidementives, antidiabetics, antidotes, anti-emetics/antivertiginosa, antiepileptic agents, antihemorrhagic agents, anti-hypertensives, antihypoglycemic agents, antihypotonic agents, anticoagulants, antimycotic agents, antiparasitary agents, antiphlogistics, antitussives/expectorants, arteriosclerosis agents, balneotherapeutics and agents for thermotherapy, beta blockers, calcium channel blockers and inhibitors of the renin-angiotensin system, broncholytics/antiasthmatics, cholagogues, and bile tract therapeutics, cholinergic agents, corticoids, dermatological agents, dietetic agents/nutrition therapeutics, diagnostic agents and adjuvants for diagnostics, diuretics, blood flow stimulants, withdrawal agents, enzyme inhibitors, enzyme preparations and transport proteins, fibrinolytics, geriatrics, gout remedies, influenza remedies, gynecological agents, antihemorrhoidal agents, hepatic agents, hypnotics/sedatives, pituitary and hypothalamic hormones, regulatory peptides and their inhibitors, immunotherapeutics and cytokines, infusion and standard injection solutions, organ perfusion solutions, cardiac remedies, caries and parodontose remedies and other dental preparations, coronary agents, laxatives, lipid depressors, neural therapeutics, gastro-intestinal agents, migraine analgesics, mineral metabolism preparations, muscle relaxants, narcotics, parathyroid hormones, calcium metabolic regulators, osteoporosis agents, neuropathy preparations and other neurotropic agents, neurotransmitters or modified neurotransmitters, ophthalmic agents, otological agents, anti-Parkinson drugs and other agents against extrapyramidal disorders, psychotropic drugs, sinusitis agents, roborants/tonics, thyroid therapeutic agents, sera, immunoglobulins and vaccines, sexual hormones and their inhibitors, spasmolytic agents, platelet-aggregation inhibitors, anti-tuberculosis drugs, immunostimulants, urological agents, vein therapeutics, vitamins, wound treating agents, cytostatic agents and metastasis inhibitors.

13. The bonding product according to claim 1, characterized in that a medicinal substance R3 is coordinatively bound to the bonding product (I), wherein R3 is a metal ion selected from the group consisting of iron, potassium, magnesium, zinc, calcium, gadolinium and copper.

14. A process for preparing a bonding product according to claim 1,
characterized in that:
in the case where:
  (a) the linkage is an amine linkage, the process comprises the following steps:
    (i) reacting the polysaccharide A with polysaccharide X to form an imine; and
    (ii) subsequently reducing the imine to the corresponding amine; or in the case where:
  (b) the linkage is an amide linkage, the process comprises the following steps:
    (i') oxidizing the aldehyde group of polysaccharide X; and
    (ii') subsequently reacting the oxidation product with polysaccharide A;
  using a device comprising an electrostatically chargeable support plate made of an insulating material, characterized in that said process comprises the following steps:
  ($\alpha$) applying a solution or suspension of chitosan or chitin A to the support plate;
  ($\beta$) electrostatically charging the support plate) to form an electric field;
  ($\gamma$) preparing a chitosan or chitin film;
  ($\delta$) reacting the chitosan or chitin A by contacting the chitosan or chitin film with a solution or suspension of polysaccharide X at a pH of greater than 6.8 to form a Schiff base;
  ($\epsilon$) reducing the Schiff base by adding a reducing agent to obtain the bonding product (I).

15. The process according to claim 14, wherein the device further comprises a pipetting and/or dosing means provided above the support plate, whose distance to the support plate can optionally be adjusted variably and whose position above the support plate can optionally be changed.

16. The process according to claim 14, characterized in that said support plate is rotatable.

17. The process according to claim 14, wherein the device further comprises a means for generating and measuring the electrostatic charge of the surface of the support plate, which means is capable of charging the top and bottom sides of the rotatable support plate electrostatically with different charges.

18. The process according to claim 16, wherein the device further comprises a means for generating and measuring different charges on the surface of the support plate, wherein said means comprises a cathode that is connected in an electrically conductive way with the center of said rotatable support plate, and an annular anode on a circumference of the surface of the support plate, wherein said electrodes are connected to a power generator.

19. The process according to claim 14, wherein the device further comprises at least one means for transilluminating the support plate as well as light detectors for measuring the light passing through the support plate, and a means for illuminating the surface of the support plate as well as light detectors for measuring the light reflected by the support plate and/or a means for magnetizing the films formed on the surface of the support plate and for measuring the magnetic fields on the surface of the support plate.

20. The process according to claim 14, characterized in that electrodes are arranged in or on the surface of the support plate which are suitable for charging the support plate electrostatically with selectable polarity and charge distribution.

21. The process according to claim 14, characterized in that an electrode is arranged above the center of the support plate at a selectable distance.

22. The process according to claim 14, characterized in that said support plate is charged electrostatically by means of a cathode ray tube.

23. The process according to claim 14, characterized in that in a step upstream to step (i) or (i'), the polysaccharide X forms aggregates of parallel molecules with macromolecules, selected from the group consisting of kappa-carrageenan, glycoproteins and macromolecules from cell membranes, said macromolecules lacking functional groups that would enable them to react with polysaccharide X and/or polysaccharide A to form a covalent bond under the reaction conditions of the following process steps.

24. The process according to claim 14, characterized in that polysaccharide A is dissolved in a solvent that is selected from the group consisting of diluted organic and inorganic acids, the solvent having a pH of less than 6.5.

25. The process according to claim 14, characterized in that said polysaccharide X is dissolved in an aqueous solution having a pH of more than 6.5.

26. The process according to claim 14, characterized in that a suitable reducing agent selected from the group of salt-like hydrides, selected from the group consisting of $LiAlH_4$, $LiBH_4$, $NaBH_4$ and $NaBH_3CN$, is used for reduction.

27. The process according to claim 14, comprising the following further steps:
(iii) substitution of X with a residue of formula (II)

$$—Z1_cR1 \qquad (II)$$

and/or
(iv) substitution of A with a residue of formula (III)

$$—Z2_dR2 \qquad (III)$$

wherein
R1 is a pharmaceutically active molecular residue,
R2 is a pharmaceutically active molecular residue, and
R1 and R2 may be the same or different, and
wherein
Z1 is a linker that is covalently bound to both R1 and X,
Z2 is a linker that is covalently bound to both R2 and A,
c=1 or 0,
d=1 or 0, and
wherein
the molar ratio of the residue of formula (II) to X is a,
the molar ratio of the residue of formula (III) to A is b,
a is an integer of from 0 to 1000,
b is an integer of from 0 to 1000, and
at least one of a and b is not zero.

28. The process according to claim 14, characterized in that the reaction products, starting materials and intermediates are separated from one another by electrophoresis and/or gel permeation chromatography and purified in accordance with their electrophoretic mobility and/or their hydrodynamic volume.

29. The process according to claim 27, characterized in that after the substitution of X with a residue of formula (II), X and A are separated from one another in a further step (v).

30. The process according to claim 14, characterized in that a medicinal substance R3 is coordinatively bound to the bonding product (I), wherein R3 is a metal ion selected from the group consisting of iron, potassium, magnesium, zinc, calcium, gadolinium and copper.

31. The process according to claim 14, further comprising:
(ζ) reacting the bonding product (I) with R1 and optionally Z1 and/or with R2 and optionally Z2 to obtain the bonding product (I) substituted with residues of formula (II) and/or (III);
(η) optionally reacting the bonding product (I) substituted with at least residues of formula (II) to cleave the amine linkage and/or amide linkage between A and X to obtain at least polysaccharide X substituted with residues of formula (II).

32. The process according to claim 14, characterized in that electrodes arranged in or on the rotatable support plate are connected in an electrically conductive way with the films and/or reagents present on the support plate.

33. The process according to claim 14 for preparing bonding product (I), characterized in that a support plate coated with a chitosan film is arranged on the screen of at least one cathode ray tube, wherein specific patterns are produced on the surface of the support plate by an appropriate modulation of the cathode ray by deflecting plates and/or deflecting coils.

34. The process according to claim 33, characterized in that said support plate is designed as a reaction vessel on the screen of the cathode ray tube.

35. The process according to claim 33, characterized in that the cathode ray incident on the support plate is selectively deflected by deflection coils onto an inspection window, wherein the distance between the cathode and the support plate may be smaller or greater than the distance between the cathode and the inspection window.

36. The process according to claim 33, characterized in that the cathode ray and the means for controlling and deflecting it are connected to a computer that obtains information from an electron microscope or another imaging device.

37. A pharmaceutical composition comprising the bonding product according to claim 1.

38. A method for preparing a biocompatible material for use in artificial blood vessels, vascular implants, artificial heart valves, heart mitral valves, tendons and ligament substitutes, cartilage substitutes, patches for closing undesirable openings during surgical interventions and wound covers; surgical adjuvants, disposable articles that are employed intracorporeally on a short-term basis, catheters, catheter tubes, suture material, biodegradable suture material, syringes, extracorporeal blood tubes, blood bags or bags for solutions for intravenous applications, and bag sheets; or as components in medical devices, the method comprising:
providing a bonding product in the biocompatible material, the bonding product consisting of:
m molecules of a polysaccharide X linked with a polysaccharide A through a linkage,
wherein said polysaccharide A is selected from the group of chitins or chitosans having a degree of deacetylation of not more than about 75%,
m is an integer of from 1 to 10,000, and
the linkage between polysaccharide X and polysaccharide A is an amine linkage, amide linkage, or both, wherein said polysaccharide X is starch, amylose, amylopectin, or combinations thereof, which is partially or completely substituted with substituents selected from the group consisting of hydroxyethyl groups and carboxymethyl groups, wherein said bonding product is substituted by having residues of formula (II) covalently bound to polysaccharide X and by having residues of formula (III) covalently bound to polysaccharide A, wherein formula (II) is —Z1$_c$R1 and formula (III) is —Z2$_d$R2 and
R1 is a pharmaceutically active molecular residue,
R2 is a pharmaceutically active molecular residue, and
R1 and R2 may be the same or different, and
wherein
Z1 is a linker that is covalently bound to both R1 and polysaccharide X,
Z2 is a linker that is covalently bound to both R2 and polysaccharide A,
c=1 or 0,
d=1 or 0, and
wherein
the molar ratio of the residue of formula (II) to polysaccharide X is a,
the molar ratio of the residue of formula (III) to polysaccharide A is b, a is an integer of up to 1000,
b is an integer of up to 1000, and
both a and b are not zero.

39. The method according to claim 38, wherein the biocompatible material is used as a material for contact lenses, as a cosmetic additive for hair conditioners, moisturizing cream or nail polish, for the immobilization of cells and enzymes, as carriers for affinity chromatography and protein separation, for controlled therapeutical systems, for systems for selective drug release or for use in technologies for tissue cultures in vitro.

* * * * *